(12) United States Patent
Makowski et al.

(10) Patent No.: US 10,988,186 B2
(45) Date of Patent: Apr. 27, 2021

(54) VEHICLE FRAME ASSEMBLY

(71) Applicant: Ford Global Technologies, LLC, Dearborn, MI (US)

(72) Inventors: Matthew B. Makowski, Northville, MI (US); Abdelmonaam Sassi, Windsor (CA); Thiag Subbian, Farmington Hills, MI (US); Jayanth Kumar Basavalingiah, West Bloomfield, MI (US); Jamil M. Alwan, Ann Arbor, MI (US); Chelliah Madasamy, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 83 days.

(21) Appl. No.: 16/667,476

(22) Filed: Oct. 29, 2019

(65) Prior Publication Data

US 2020/0062319 A1 Feb. 27, 2020

Related U.S. Application Data

(62) Division of application No. 15/715,057, filed on Sep. 25, 2017, now Pat. No. 10,494,034.

(51) Int. Cl.
| | |
|---|---|
| *B60R 19/34* | (2006.01) |
| *B62D 25/20* | (2006.01) |
| *H01M 50/20* | (2021.01) |
| *B60K 1/04* | (2019.01) |
| *B60K 6/22* | (2007.10) |
| *B62D 25/02* | (2006.01) |

(Continued)

(52) U.S. Cl.
CPC ............ *B62D 25/2036* (2013.01); *B60K 1/04* (2013.01); *B60K 6/22* (2013.01); *B62D 25/025* (2013.01); *B62D 25/085* (2013.01); *B62D 25/20* (2013.01); *B62D 27/065* (2013.01); *H01M 50/20* (2021.01); *B60K 2001/0438* (2013.01); *B60Y 2200/91* (2013.01); *B60Y 2200/92* (2013.01); *B60Y 2306/01* (2013.01); *B60Y 2400/112* (2013.01); *B60Y 2410/114* (2013.01); *H01M 2220/20* (2013.01); *Y10S 903/904* (2013.01)

(58) Field of Classification Search
CPC .. B62D 25/025; B62D 25/04; B62D 25/2036; B62D 21/157; B62D 25/20; F02B 2275/18; A47C 3/029; A63C 9/0844; A63C 9/0846; F01L 13/065
See application file for complete search history.

(56) References Cited

U.S. PATENT DOCUMENTS

| | | |
|---|---|---|
| 5,454,453 A | 10/1995 | Meyer et al. |
| 6,227,322 B1 | 5/2001 | Nishikawa |

(Continued)

OTHER PUBLICATIONS

Restriction Requirement dated Jan. 3, 2019 re U.S. Appl. No. 15/715,057, filed Sep. 25, 2017.

(Continued)

*Primary Examiner* — Kiran B Patel
(74) *Attorney, Agent, or Firm* — Frank A. MacKenzie; Bejin Bieneman PLC

(57) ABSTRACT

An assembly includes a subframe, a rocker, a battery cage supported by the rocker, and a battery supported by the battery cage. The assembly includes a reinforcement bolted to the rocker and positioned to be along a load path through the subframe resulting from a vehicle frontal impact.

13 Claims, 5 Drawing Sheets

(51) Int. Cl.
*B62D 25/08* (2006.01)
*B62D 27/06* (2006.01)

(56) References Cited

U.S. PATENT DOCUMENTS

| | | | |
|---|---|---|---|
| 6,916,063 B2 | 7/2005 | Song | |
| 7,494,166 B2 | 2/2009 | Vismara et al. | |
| 8,336,658 B2 | 12/2012 | Rawlinson et al. | |
| 8,573,683 B2 | 11/2013 | Gadhiya et al. | |
| RE44,944 E | 6/2014 | Billington et al. | |
| 9,493,189 B2 | 11/2016 | Nusier et al. | |
| 9,688,311 B2* | 6/2017 | Yamamoto | B62D 25/025 |
| 9,926,017 B1* | 3/2018 | Hamilton | B62D 27/02 |
| 2012/0086238 A1* | 4/2012 | Tan | B62D 25/025 |
| | | | 296/209 |
| 2012/0153682 A1* | 6/2012 | Rawlinson | B60J 10/24 |
| | | | 296/209 |
| 2012/0169089 A1 | 7/2012 | Rawlinson et al. | |
| 2012/0175916 A1 | 7/2012 | Rawlinson et al. | |
| 2013/0249243 A1 | 9/2013 | Lee et al. | |
| 2013/0270863 A1* | 10/2013 | Young | B60R 16/04 |
| | | | 296/187.12 |
| 2014/0291046 A1 | 10/2014 | Araki | |
| 2015/0174996 A1* | 6/2015 | Ikeda | B60K 1/04 |
| | | | 180/68.5 |
| 2015/0249240 A1* | 9/2015 | Hihara | B62D 21/157 |
| | | | 180/68.5 |
| 2016/0068196 A1 | 3/2016 | Saeki | |
| 2016/0114699 A1* | 4/2016 | Hokazono | B60K 1/04 |
| | | | 180/68.5 |
| 2016/0236713 A1* | 8/2016 | Sakaguchi | B62D 21/157 |
| 2016/0244098 A1 | 8/2016 | Kanemori et al. | |
| 2016/0251034 A1 | 9/2016 | Kumagai | |
| 2016/0257187 A1 | 9/2016 | Nakajima | |
| 2017/0029034 A1 | 2/2017 | Faruque et al. | |
| 2017/0158039 A1* | 6/2017 | Nakamura | B60K 1/04 |
| 2018/0029646 A1* | 2/2018 | Kanagai | B60J 5/06 |
| 2018/0050607 A1 | 2/2018 | Matecki et al. | |
| 2018/0109016 A1 | 4/2018 | Fees et al. | |
| 2018/0127032 A1* | 5/2018 | Atsumi | B62D 21/157 |
| 2018/0162447 A1 | 6/2018 | Fees et al. | |
| 2018/0194211 A1 | 7/2018 | Hamilton et al. | |
| 2018/0194212 A1* | 7/2018 | Hamilton | B62D 21/02 |
| 2018/0215245 A1 | 8/2018 | Sudhindra et al. | |
| 2018/0272852 A1* | 9/2018 | Ajisaka | B60K 1/04 |
| 2018/0337374 A1 | 11/2018 | Matecki et al. | |
| 2018/0337377 A1 | 11/2018 | Stephens et al. | |
| 2018/0337378 A1 | 11/2018 | Stephens et al. | |
| 2019/0002026 A1 | 1/2019 | Ayukawa | |
| 2019/0016388 A1 | 1/2019 | Shimizu | |
| 2019/0023323 A1* | 1/2019 | Uehata | B62D 21/15 |
| 2019/0047411 A1 | 2/2019 | Kataoka et al. | |
| 2019/0256154 A1* | 8/2019 | Kamimura | B62D 25/04 |

OTHER PUBLICATIONS

Non-Final Office Action dated Apr. 19, 2019 re U.S. Appl. No. 15/715,057, filed Sep. 25, 2017.

Notice of Allowance dated Jul. 30, 2019 re U.S. Appl. No. 15/715,057, filed Sep. 25, 2017.

* cited by examiner

VEHICLE FRAME ASSEMBLY

CROSS-REFERENCE TO RELATED APPLICATION

This patent application claims priority to and is a Divisional Application of U.S. patent application Ser. No. 15/715,057 filed Sep. 25, 2017, which is hereby incorporated by reference in its entirety.

BACKGROUND

A vehicle body includes various structural components. During a vehicle frontal impact, some of these components may be designed to deform to absorb energy resulting from the vehicle frontal impact and some of these components may be designed to remain rigid to transmit energy resulting from the vehicle frontal impact.

DETAILED DESCRIPTION

Figure 1:
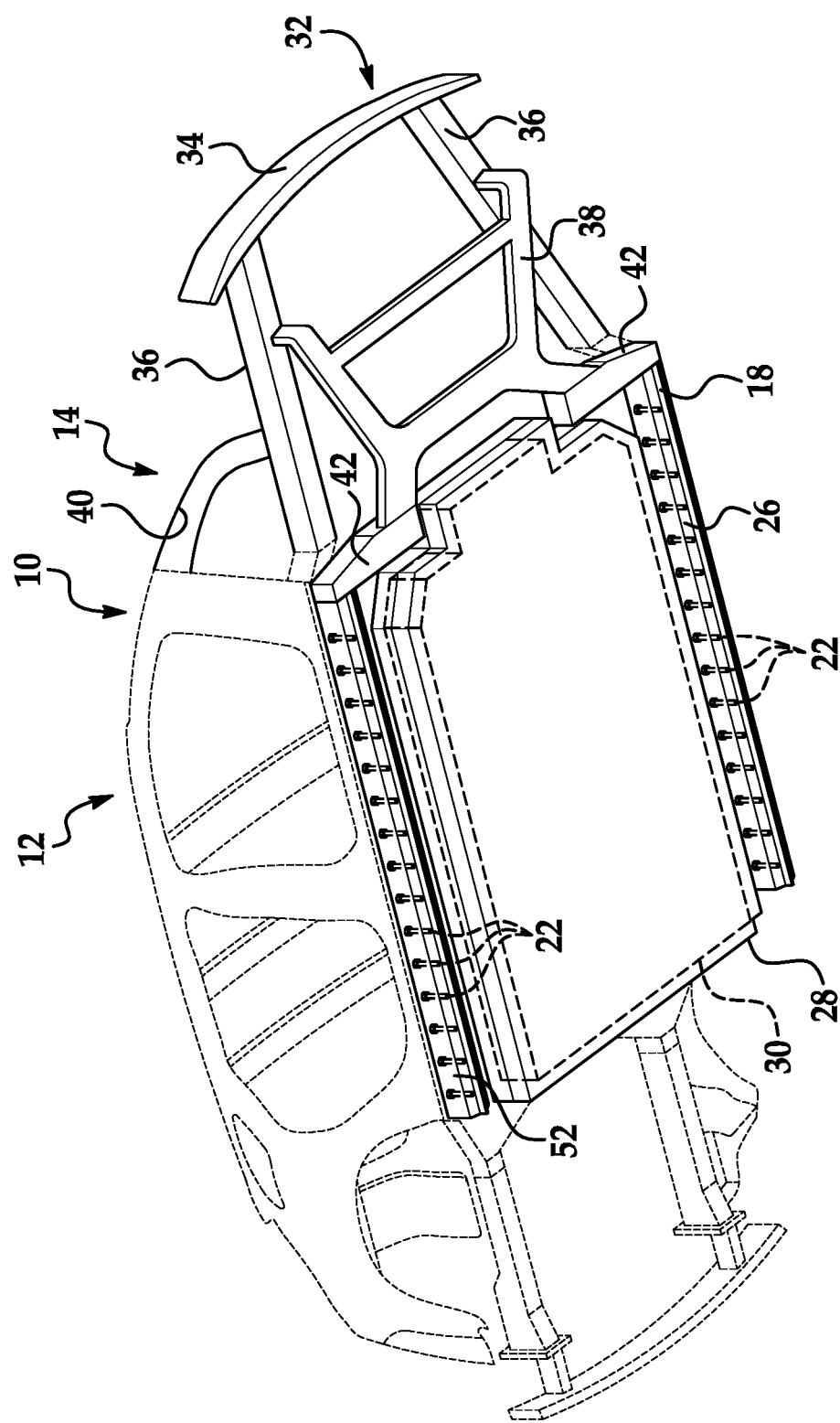
FIG. 1 is a perspective view of a vehicle frame.

An assembly includes a subframe, a rocker, a battery cage supported by the rocker, and a battery supported by the battery cage. The assembly includes a reinforcement bolted to the rocker and positioned to be along a load path through the subframe resulting from a vehicle frontal impact.

The assembly may include bolts connecting the reinforcement to the rocker. The bolts may be designed to be breakable relative to at least one of the reinforcement and the rocker.

The reinforcement may separate from the rocker when the bolts break relative to at least one of the reinforcement and the rocker.

The assembly may include bolts connecting the reinforcement to the rocker at connection points. At least one of the bolts, the reinforcement at the connection points, and the rocker at the connection points may be designed to allow the reinforcement to separate from the rocker during the vehicle frontal impact.

The subframe may be fixed to the rocker throughout the vehicle frontal impact.

The reinforcement may be elongated along a longitudinal axis. The bolts may be spaced along the longitudinal axis.

The reinforcement may have a cross-section that is rectangular.

The cross-section of the reinforcement may be hollow.

The reinforcement may have a cross-section that is hollow.

The assembly may include a bridging bracket extending from the subframe to the reinforcement.

The rocker may include a topside and an underside opposite the topside. The reinforcement may be bolted to the underside of the rocker.

The reinforcement may be spaced from the battery cage.

The rocker may be between the reinforcement and the battery cage.

The assembly may include a second rocker opposite the rocker. The battery cage may extend from the rocker to the second rocker.

The assembly may include a second rocker. The second rocker may be spaced from the rocker. The battery cage may be between the second rocker and the rocker.

An assembly includes a rocker elongated along a longitudinal axis. The assembly includes a reinforcement bolted to the rocker and elongated along an axis parallel to the longitudinal axis. The assembly includes bolts connecting the reinforcement to the rocker. The bolts may be spaced along the longitudinal axis. The bolts may connect the reinforcement to the rocker at connection points. At least one of the bolts, the reinforcement at the connection points, and the rocker at the connection points may be designed to allow the reinforcement to separate from the rocker during a vehicle frontal impact.

The reinforcement may be positioned to be along a load path resulting from the vehicle frontal impact.

The bolts may be designed to be breakable relative to at least one of the reinforcement and the rocker.

The reinforcement may have a cross-section that is rectangular and hollow.

The assembly may include a battery cage supported by the rocker. The battery cage may be spaced from the reinforcement.

With reference to the Figures, wherein like numerals indicate like parts throughout the several views, an assembly 14 is generally shown. The assembly 14 may be referred to as a vehicle frame assembly. The assembly 14 includes a subframe 38, a rocker 18, a battery cage 28 supported by the rocker 18, and a battery 30 supported by the battery cage 28. The assembly 14 includes a reinforcement 26 bolted to the rocker 18 and positioned to be along a load path P through the subframe 38 resulting from a vehicle frontal impact.

Since the reinforcement 26 is bolted to the rocker 18 and positioned to be along a load path P through the subframe 38 resulting from a vehicle frontal impact, the reinforcement 26 absorbs energy along the load path P during the vehicle frontal impact to reduce the likelihood of damage to the battery 30 during the vehicle frontal impact. For example, as described further below, the reinforcement 26 may separate from the rocker 18 to absorb energy transmitted through the rocker 18, i.e., to eliminate or reduce force transmitted from the rocker 18 to the battery cage 28 and the battery 30 during the vehicle frontal impact and eliminate or reduce deformation of the battery cage 28.

With reference to FIG. 1, a vehicle 10 may include a body 12 and the assembly 14. The body 12 may be of a unibody construction. In the unibody construction, the body 12, e.g., the rocker 18, a second rocker 20, a front end 32, pillars (not numbered), roof rails (not numbered), etc., serves as the vehicle frame, and the body 12 is unitary, i.e., a continuous one-piece unit. The body 12 and/or the frame may be formed of any suitable material, for example, steel, aluminum, etc.

Figure 4:
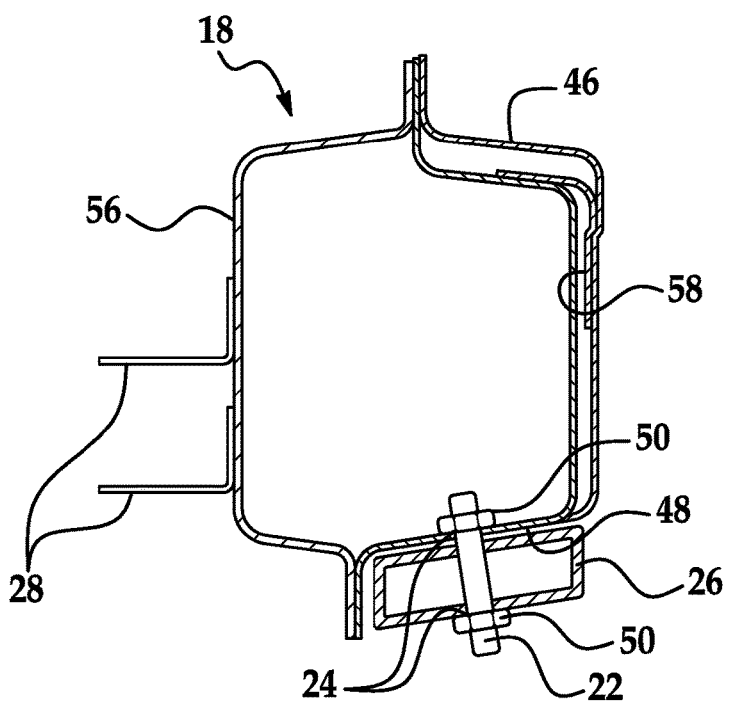
FIG. 4 is a cross-sectional view of a rocker and reinforcement of the vehicle frame.

The rocker 18 and the second rocker 20 are elongated along a longitudinal axis, respectively (also referred to as a rocker axis 54). The second rocker 20 is opposite the rocker 18 relative to the battery cage 28. The rocker axes 54 may each extend generally parallel to a side of the battery cage 28. The rocker 18, 20 may include an inner member 56 and an outer member 58, the inner member 56 and the outer member 58 being fixed to each other in any suitable way, for example, bolting, welding, etc. The battery cage 28 may be fixed to the inner member 56 of the rocker 18, 20. The rocker 18, 20 may include a topside 46 and an underside 48 opposite the topside 46. The rocker 18, 20 may have a cross section that is hollow as shown in FIG. 4, or the cross section may be solid. The rocker 18, 20 may be formed of any suitable material, for example, steel, aluminum, etc.

With continued reference to FIG. 1, the vehicle 10 may include the battery 30. The battery 30 may be of any suitable type for vehicular electrification, for example, lithium-ion batteries, nickel-metal hydride batteries, lead-acid batteries, or ultracapacitors, as used in, for example, plug-in hybrid electric vehicles (PHEVs), hybrid electric vehicles (HEVs), or battery electric vehicles (BEVs).

As set forth above, the battery 30 is supported by the battery cage 28. The battery cage 28 may be supported by the rocker 18, e.g., the battery cage 28 may be fixed to the rocker 18. As one example, the battery cage 28 may be directly fixed to the rocker 18 or the battery cage 28 may be fixed to the rocker 18 through an intermediary. The battery cage 18 may be fixed to the rocker 18 in any suitable way, for example, bolting, welding, etc. As another example, the battery cage 28 and the rocker 18 may be unitary, i.e., a continuous one-piece unit. The battery cage 28 may be generally the same shape as the battery 30, or any other suitable shape. The battery cage 28 may be formed of any suitable material, for example, steel, aluminum, etc.

The battery cage 28 may be between the rocker 18 and the second rocker 20. The battery cage 28 may extend from the rocker 18 to the second rocker 20.

Figure 2:
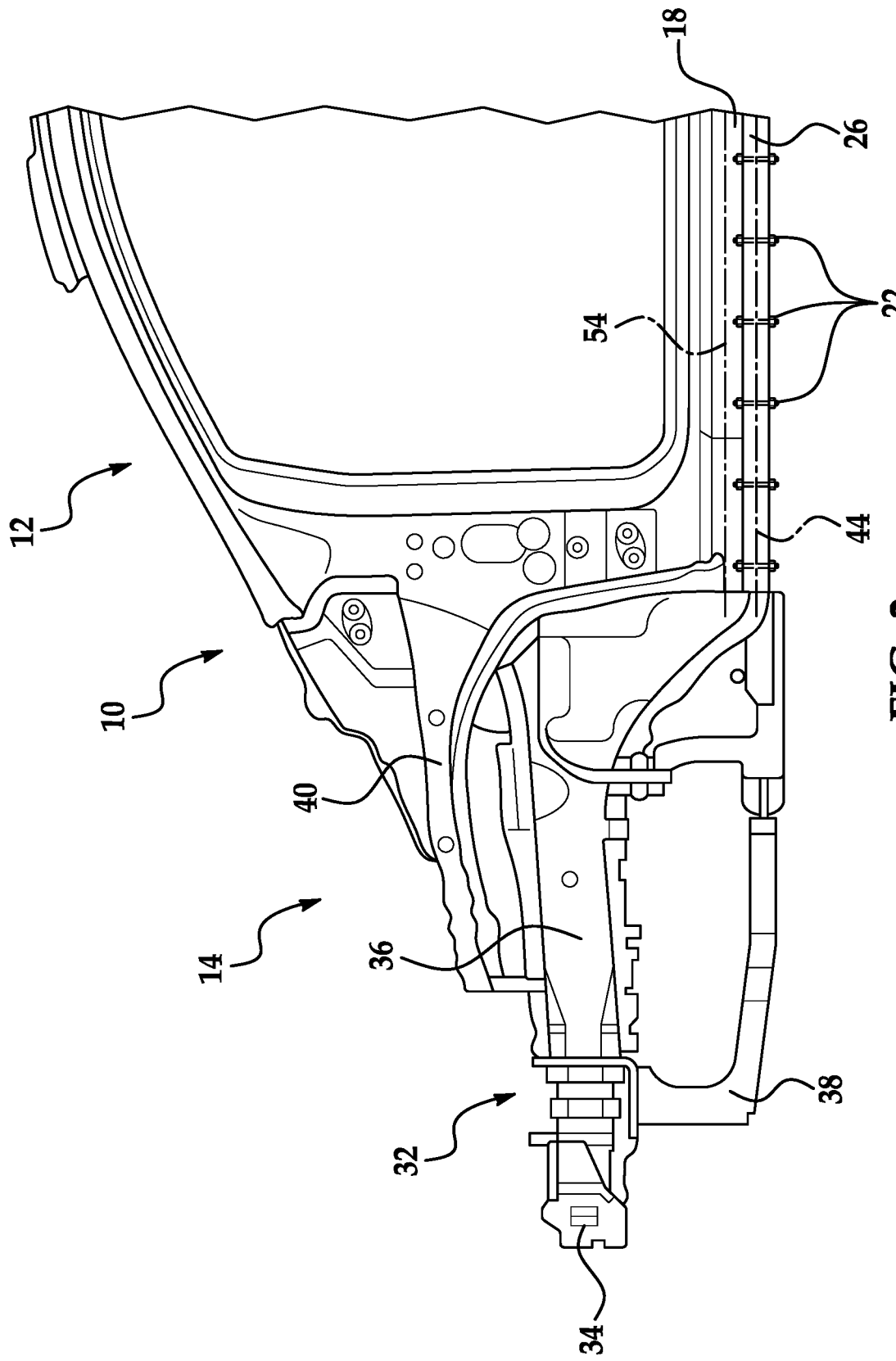
FIG. 2 is a side view of a portion of the vehicle frame.
Figure 3:
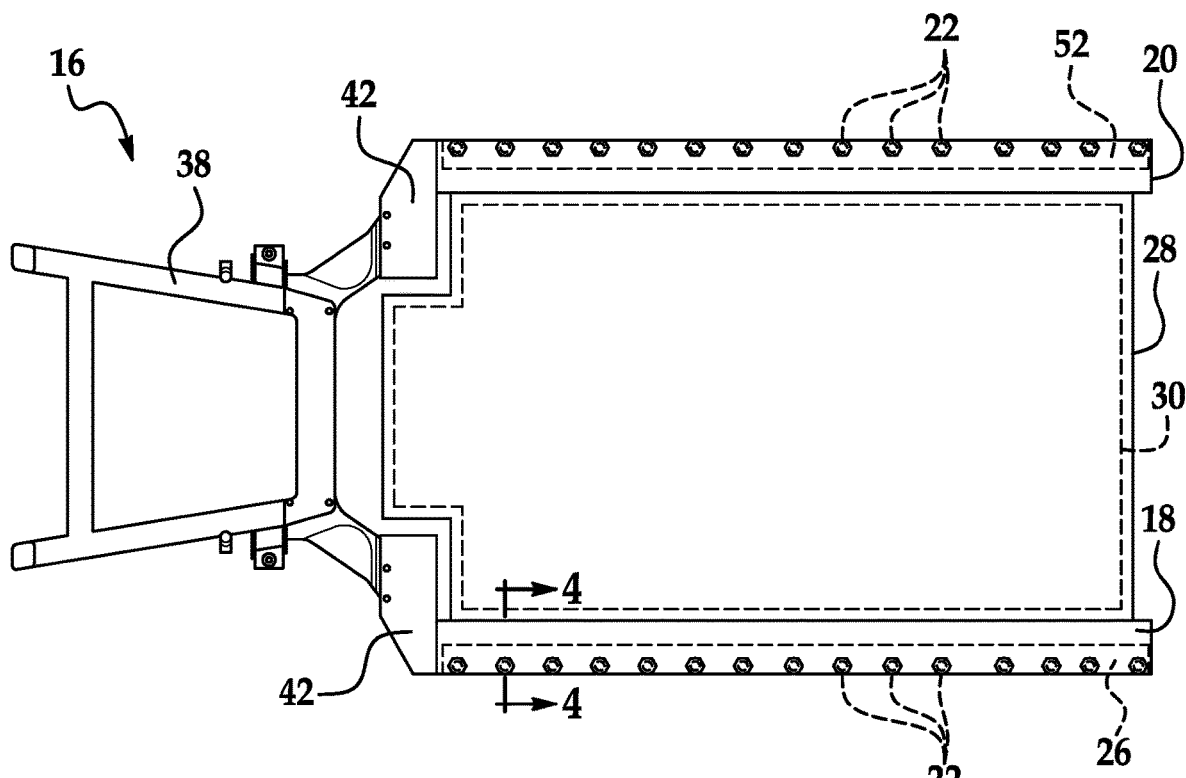
FIG. 3 is a top view of the vehicle frame.

With continued reference to FIGS. 1 and 2, the body 12 of the vehicle 10 includes the front end 32. The front end 32 may include a bumper 34, a pair of beams 36, and a pair of upper rails 40. The beams 36 may extend from another component of the body 12, e.g., hinge pillars as shown in FIG. 2, to the bumper 34. The bumper 34 may be supported by each of the beams 36 and may extend from one of the beams 36 to the other of the beams 36. The upper rails 40 may be positioned above the beams 36. The upper rails 40 may extend from another component of the body 12, e.g., hinge pillars as shown in FIG. 2, to the beams 36.

With reference to FIGS. 1 and 2, the vehicle 10 may include the subframe 38. The subframe 38 may be supported by the front end 32. For example, as shown in FIGS. 1 and 2, vehicle-forward ends of the subframe 38 are connected to the beams 36. The subframe 38 may be connected to the beams 36 in any suitable fashion, e.g., with fasteners.

The subframe 38 is fixed to the body 12, i.e., the rockers 18, 20. As one example, the subframe 38 may be indirectly fixed to the body 12 through an intermediate component. As one example, a bridging bracket 42 may be disposed between the subframe 32 and the rockers 18, 20 and reinforcements 26, 52. The bridging bracket 42 may be fixed to the subframe 32 and the rockers 18, 20 and the reinforcements 26, 52 in any suitable way, for example, bolting, welding, etc. As another example, the subframe 38 may be directly fixed to the body 12, i.e., the rockers 18, 20. The subframe 38 may be fixed to the body 12, i.e., the rockers 18, 20, in any suitable way, for example, bolting, welding, etc. The subframe 38 may be formed of any suitable material, for example, steel, aluminum, etc.

Figure 5:
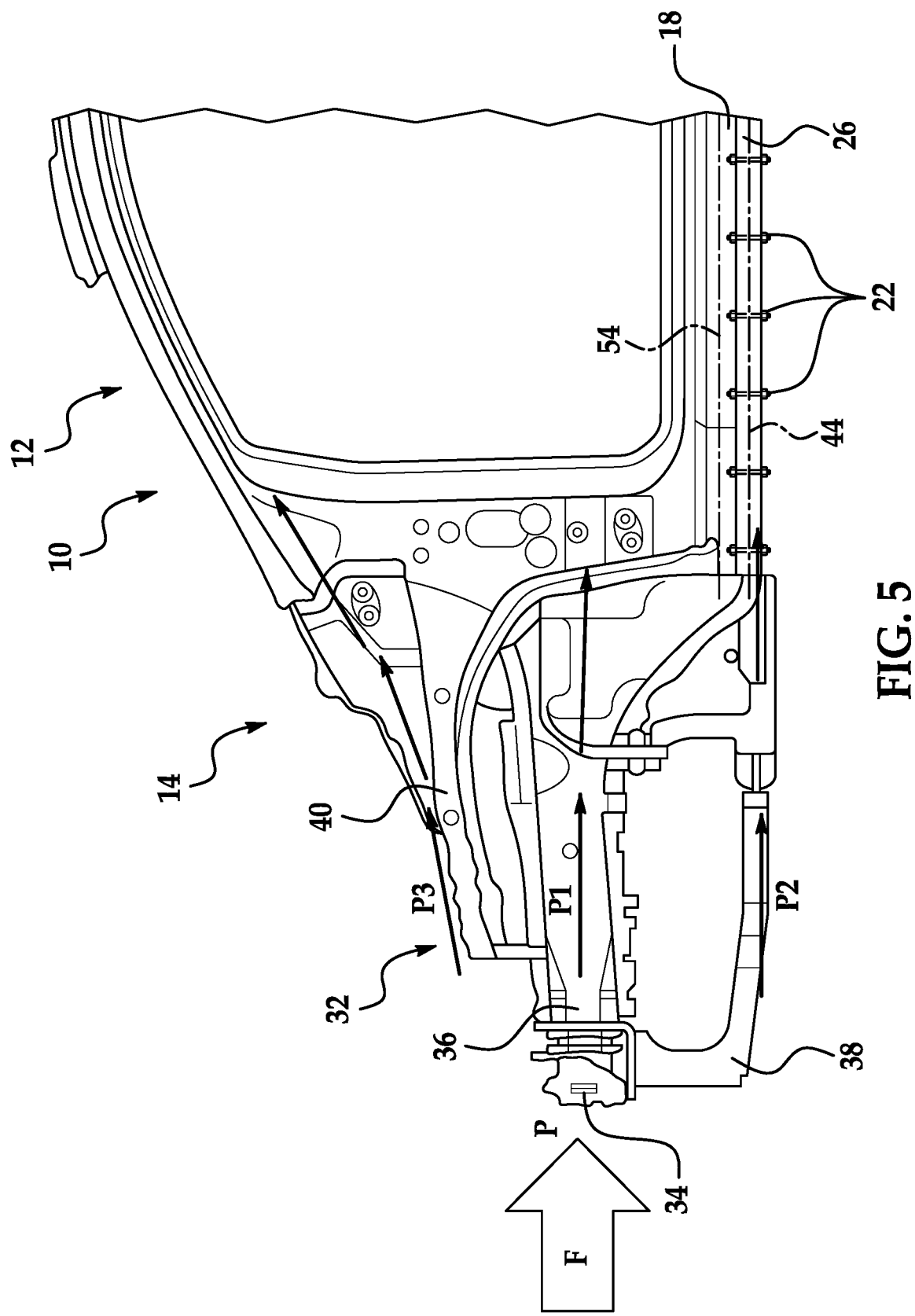
FIG. 5 is a side view of the vehicle frame and a force being exerted on the vehicle frame.

With reference to FIG. 5, the subframe 38 may define the load path P resulting from the vehicle frontal impact. For example, a force F, from, for example, another vehicle, a barrier, etc., may be exerted on the vehicle 10 during the vehicle frontal impact. The vehicle frontal impact may be, for example, a full frontal impact, a moderate overlap impact, a small overlap impact, a front oblique impact, etc. Test standards for these various types of vehicle frontal impacts are maintained, for example, by the Insurance Institute for Highway Safety (IIHS), the National Highway and Traffic Safety Administration (NHTSA), European New Car Assessment Program (EuroNCAP), etc.

With continued reference to FIG. 5, the force F may be transmitted through the front end 32, and may be transmitted through the subframe 38 along the load path P. The load path P includes a middle load path P1, a lower load path P2, and an upper load path P3. The middle load path P1 may extend along the beams 36, the lower load path P2 may extend along the subframe 38, and the upper load path P3 may extend along the upper rails 40. The middle load path P1 may receive a majority of the force F, causing the bumper 34 and the beams 36 to deform, i.e., crush, as shown in FIG. 5.

As set forth above, the assembly 14 may include the bridging bracket 42 and, in such an example, the bridging bracket 42 is positioned to be along the lower load path P2, and the bridging bracket 42 transmits the force F from the subframe 38 to the reinforcements 26, 52. The bridging bracket 42 may be designed to be substantially rigid relative to the subframe 38, the rockers 18, 20, and the reinforcements 26, i.e., designed to transfer force from the subframe 38 to the rockers 18, 20 and reinforcements 26. The bridging bracket 42 may be formed of any suitable material, for example, cast steel, cast aluminum, etc.

The subframe 38 may remain fixed to the rockers 18, 20 throughout the vehicle frontal impact. For example, after the force F has passed through the vehicle 10 and there are no more forces resulting from the vehicle frontal impact being exerted on the vehicle 10, the subframe 38 may still be fixed to the rockers 18, 20. Specifically, in the example in which the assembly 14 includes the bridging brackets 42, the subframe 38 remains fixed to the bridging brackets 42 and the bridging brackets 42 remain fixed to the rockers 18, 20 during and after the vehicle frontal impact.

With reference to the Figures, the assembly 14 includes the reinforcements 26, 52 bolted to the rockers 18, 20, respectively. The reinforcements 26, 52 are elongated along an axis, i.e., a reinforcement axis 44, generally parallel to the longitudinal axis, i.e., the rocker axis 54. As set forth above, the reinforcement 26 is positioned to be along the load path P through the subframe 38 resulting from the vehicle frontal impact. For example, the reinforcement 26 may be positioned to be along the lower load path P2, and the reinforcement 26 may transmit and/or absorb a portion of the force F.

Figure 6:
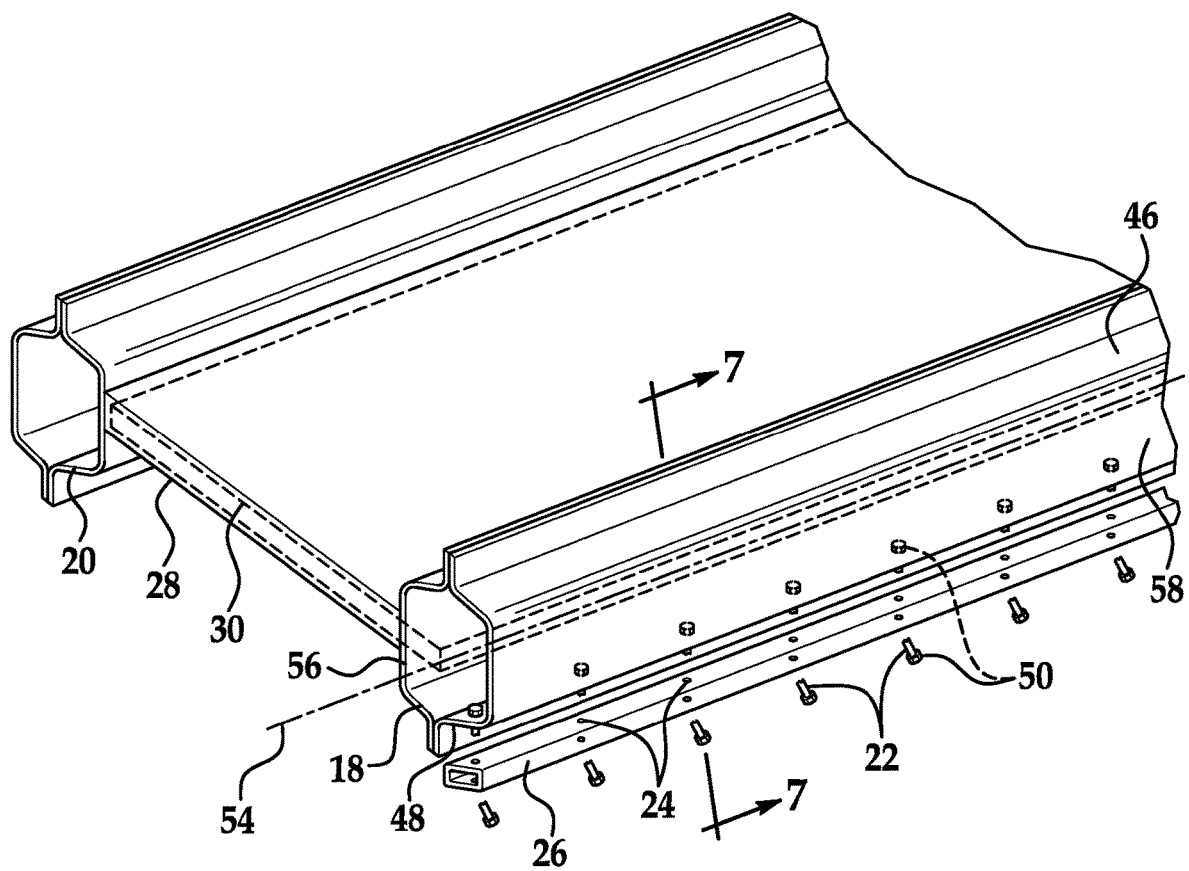
FIG. 6 is a perspective view of a portion of the vehicle frame after the force has been exerted on the vehicle frame with the reinforcement separated from the rocker.
Figure 7:
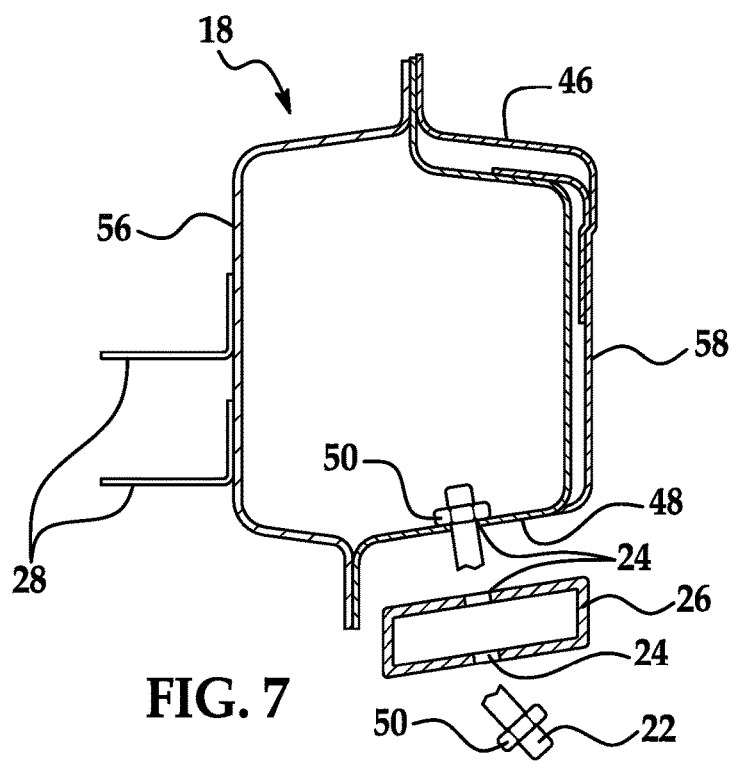
FIG. 7 is a cross-sectional view of the rocker and reinforcement of FIG. 6 after the force has been exerted on the vehicle frame.

With reference to FIGS. 4, 6 and 7, the reinforcement 26 may have a cross-section that is rectangular. As another example, the cross-section of the reinforcement may be any suitable shape, for example, circular, elliptical, triangular, etc. The reinforcement 26 may be hollow. As another example, the cross-section of the reinforcement 26 may be solid. The reinforcement 26 may be formed of any suitable material, for example, steel, aluminum, etc.

As set forth above, the reinforcement 26 is bolted to the rocker 18. For example, the reinforcement 26 may be bolted to the underside 48 of the rocker 18. As another example, the reinforcement 26 may be bolted to the topside 46 of the rocker 18. Alternatively, the reinforcement 26 may be bolted to the rocker 18 at any suitable location. The reinforcement 26 may be spaced from the battery cage 28. For example, the battery cage 28 may be fixed to the inner member 56 of the rocker 18, the reinforcement 26 may be bolted to the underside 48 of the rocker 18, and the rocker 18 may be between the reinforcement 26 and the battery cage 28.

With reference to the Figures, the assembly 14 may include bolts 22 connecting the reinforcement 26 to the rocker 18 at connection points 24. The bolts 22 may be spaced along the longitudinal axis, i.e., the reinforcement axis 44. The bolts 22 may be evenly spaced along the reinforcement axis 44, or the bolts 22 may be spaced along the reinforcement axis 44 in any suitable pattern. The bolts 22 may extend completely through the reinforcement 26 and may include weld nuts 50 disposed on each end of the bolts 22. The bolts 22 may be any suitable size and shape. The bolts 22 may be formed of any suitable material, for example, steel, aluminum, etc.

At least one of the bolts 22, the reinforcement 26 at the connection points 24, and the rocker 18 at the connection points 24 may be designed to allow the reinforcement 26 to separate from the rocker 18 during the vehicle frontal impact. For example, when the force F from the vehicle frontal impact is exerted on the vehicle 10 and passes through the lower load path P2, the force F may cause the bolts 22 to break relative to at least one of the reinforcement 26 and the rocker 18; and/or the force F may cause the reinforcement 26 at the connection points 24 to deform and expand to a size greater than a diameter of the bolts 22, causing the reinforcement 26 to separate from the rocker 18; and/or the force F may cause the rocker 26 at the connection points 24 to deform and expand to a size greater than the diameter of the bolts 22, causing the reinforcement 26 and the bolts 22 to separate from the rocker 18.

As shown in FIGS. 6 and 7, the bolts 22 may be designed to be breakable relative to at least one of the reinforcement 26 and the rocker 18. For example, when the force F is exerted on the vehicle 10 and passes through the lower load path P2, the force F may cause the bolts 22 to break relative to at least one of the reinforcement 26 and the rocker 18. The reinforcement 26 may separate from the rocker 18 when the bolts 22 break relative to at least one of the reinforcement 26 and the rocker 18. For example, as shown in FIGS. 6 and 7, when the bolts 22 break, the reinforcement 26 separates from the rocker 18.

With reference to FIG. 5, during the vehicle frontal impact, at least some of the force F is transmitted along the load path P2 from the subframe 38, through the bridging brackets 42, to the rockers 18, 20 and the reinforcements 26, 52. As the force F is transmitted to the rockers 18, 20 and the reinforcements 26, 52, the reinforcements 26, 52 separate from the rockers 18, 20 to absorb the force F and eliminate or reduce force applied to the battery cage 28 to eliminate or reduce deformation of the battery cage 28. As one example, as shown in FIGS. 6 and 7, the bolts 22 may break to absorb the force F, allowing the reinforcements 26, 52 to separate from the rockers 18, 20.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
a rocker elongated along a longitudinal axis;
a reinforcement bolted to the rocker and elongated along an axis parallel to the longitudinal axis; and
bolts connecting the reinforcement to the rocker;
the bolts being spaced along the axis parallel to the longitudinal axis;
the bolts connecting the reinforcement to the rocker at connection points, at least one of the bolts, the reinforcement at the connection points, and the rocker at the connection points being designed to allow the reinforcement to separate from the rocker during a vehicle frontal impact.

2. The assembly of claim 1, wherein the reinforcement is positioned to be along a load path resulting from the vehicle frontal impact.

3. The assembly of claim 1, wherein the bolts are designed to be breakable relative to at least one of the reinforcement and the rocker.

4. The assembly of claim 1, wherein the reinforcement has a cross-section that is rectangular and hollow.

5. The assembly of claim 1, further comprising a battery cage supported by the rocker, the battery cage being spaced from the reinforcement.

6. The assembly of claim 1, wherein the rocker includes a topside and an underside opposite the topside, and the reinforcement is bolted to the underside of the rocker.

7. The assembly of claim 1, further comprising a battery cage supported by the rocker.

8. The assembly of claim 7, wherein the reinforcement is spaced from the battery cage.

9. The assembly of claim 7, wherein the rocker is between the reinforcement and the battery cage.

10. The assembly of claim 7, further comprising a second rocker spaced from the rocker, and the battery cage being between the rocker and the second rocker.

11. The assembly of claim 1, wherein the reinforcement is positioned on the rocker to be along a load path through a subframe resulting from a vehicle frontal impact.

12. The assembly of claim 1, further comprising a bridging bracket fixed to the rocker, the bridging bracket being positioned to be along a load path between a subframe and the reinforcement resulting from a vehicle frontal impact.

13. The assembly of claim 12, wherein the bridging bracket is designed to be substantially rigid relative to the reinforcement.

* * * * *